UNITED STATES PATENT OFFICE

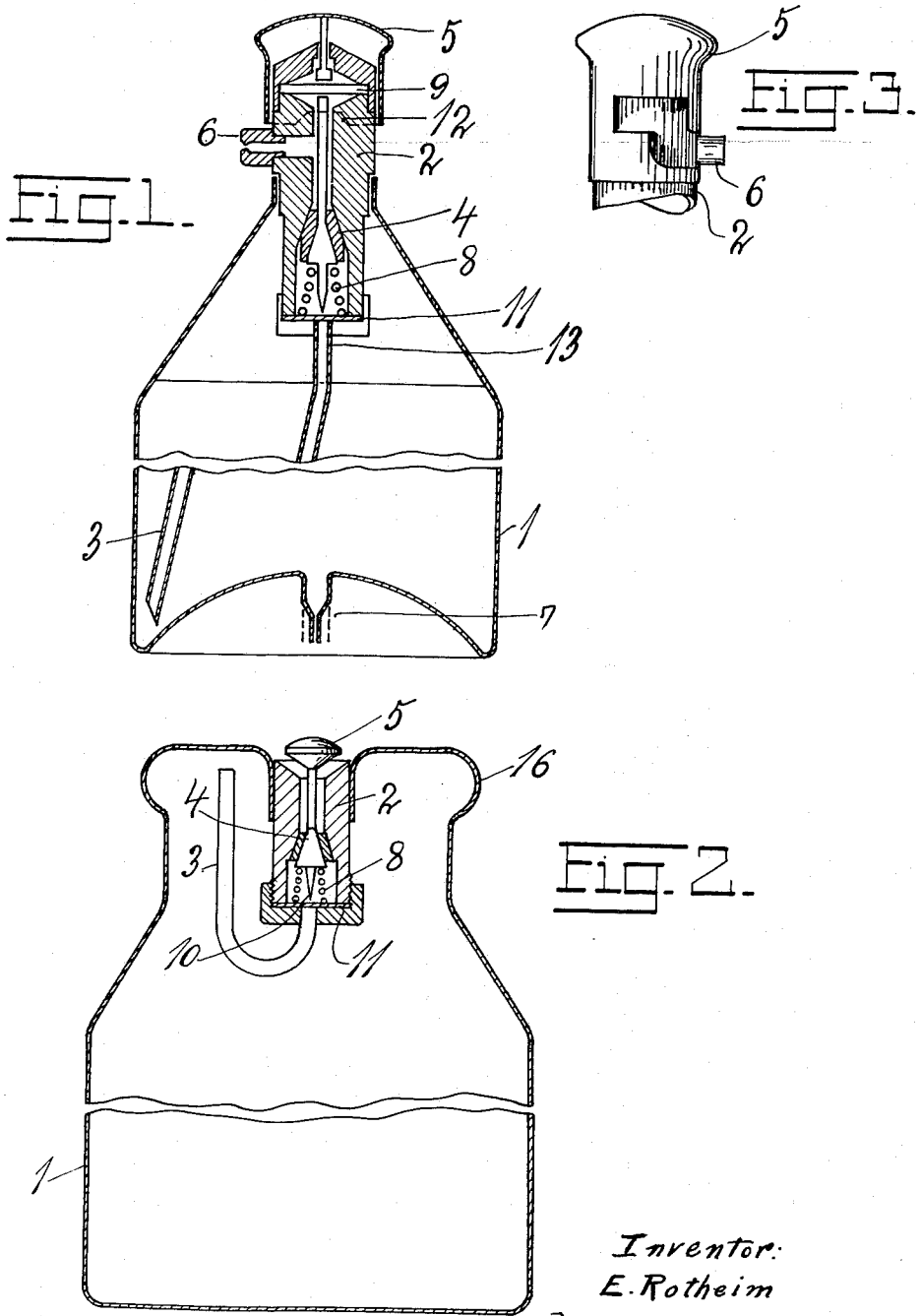

ERIK ROTHEIM, OF OSLO, NORWAY

METHOD AND MEANS FOR THE ATOMIZING OR DISTRIBUTION OF LIQUID OR SEMI-LIQUID MATERIALS

Application filed September 30, 1927, Serial No. 223,143, and in Norway October 8, 1926.

This invention has for its object a method for the atomizing or distribution of liquid or semiliquid materials as well as means for carrying the method into effect.

The invention also comprises a method of preparing the liquids or materials to be atomized or distributed as well as the products obtained by the said preparation.

According to the invention the material to be dispensed is enclosed in a pressure resisting vessel together with dimethyl ether under a pressure sufficient to effect liquefaction of the dimethyl ether by condensation. The substance dimethyl ether ($CH_3OCH_3$) is a gas at ordinary temperature. In a liquefied condition it has a boiling point of $-24.9°$ C. ($24.9°$ C. below zero). Its vapor density is 1.617 and its specific volume in a gaseous condition is 350 times its specific volume in a liquid condition at ordinary atmospheric pressure and room temperature.

When an outlet opening in the container enclosing the material and the condensed dimethyl ether is opened the material will be forced out under the pressure prevailing in the container. By suitably constructing the outlet means it is possible to cause the material to pass out in the form of a solid jet or as a more or less finely subdivided or atomized spray. The pressure medium which is discharged at the same time will at once evaporate. By adding a non-combustible volatile substance such as for example carbon tetrachloride it is possible, when desired, to lower the ignition temperature of the resulting vapors.

The invention comprises the use of the described method for atomizing or distributing liquids, semiliquids or solid substances (and solutions thereof) of any kind for example oils, fats, liquid soaps, resins, paraffines, waxes, dyes, paints, varnishes, lacquers (such as for example cellulose lacquers), rubber, gums, glue, disinfectants, impregnation means, protection means, polishing means, fertilizers, fire extinguishing means, cosmetic products, organic or inorganic liquids (for example solvents), etc.

If the material to be atomized spread or distributed is an oil (or fat) the invention may for example be carried out in the following manner:

The oil is introduced into a pressure resisting metal bottle and is thereupon supplied under pressure with a measured quantity of condensed dimethyl ether.

Dimethyl ether is an excellent solvent for most of the fatty and mineral oils, fats, resins, waxes, cellulose compounds and other natural and synthetic carbon compounds, solutions of rubber, guttapercha and glue as well as other organic and inorganic solutions and solvents. Its distributing property is greater than that of ethyl ether, because dimethyl ether contains a less number of carbon atoms. As a consequence of its high dissolving power varnishes and lacquers etc. for use together with this substance can be produced by direct dissolution of the individual substance separately without preceding treatments (boiling etc.)

When the oil to which has been added for example 20% dimethyl ether contained in the metal bottle is caused to be discharged through a small orifice in the bottom of the bottle an ideal atomizing or spraying of the contents will result. Dimethyl ether having at $+20°$ C. a superpressure of $4,7-1,0=3,7$ atmospheres is instantaneously evaporated after having left the fine orifice and subdivides the dissolved matter. According to the percentage of added dimethyl ether drops or particles from the coarsest to the finest size of the discharged contents are produced.

Thus for example, if a substance of the volume $a$ is supplied with ethyl alcohol—as a carrier for $CO_2$—in the volume quantity of $\frac{1}{2} a$ (viz. the alcohol being one third of the entire volume of liquid) then at 3 atmospheres pressure and $+20°$ C. the volume of $CO_2-$ gas dissolved will be only three times the volume of liquid.

As compared with this in the case of the dimethyl ether one third of the volume $a$ of dimethyl ether in a liquid state represents a quantity of gas which is $350:\frac{1}{3}=120$ times larger than the volume of $a$ and about 40 times larger than the $CO_2$ volume referred to above.

It is to be noted that the volume of methyl ether as a gas is about 350 times as large as that of the same quantity in a liquid state.

The metal bottle (or the bottle or container of other suitable material) can suitably be provided with an inner ascending pipe communicating with a valve having a discharging opening (ejector) on the top of the bottle. The ascending pipe has an opening into the liquid space and it may be also to the gas space above the liquid. The valve can be opened and closed for a shorter or longer period by means of a pressure knob.

The form of the container and the construction of the atomizing, spraying or distributing means will vary depending upon the character of the substances to be treated. When substances of a thickly fluid consistence are to be handled and have for example to be spread on a surface stress will not always be laid on constructing the distributing means so as to effect atomizing of the material. In such cases the distributing means or the adjacent parts of the apparatus can with advantage be so arranged as to serve at the same time as a spreading device.

When the desired method is to be used for example for eau de Cologne this material obtains the novel property of giving a spray which is considerably cooled in relation to the atmospheric temperature as a consequence of the expansion of the added condensed gas.

Viscous products such as for example lacquers and varnishes are made thinly fluid by the addition of dimethyl ether and obtain a consistency suitable for spraying purposes without heating. Cosmetic products such as for example liquid or solid brilliantines, pomatums, vaselines, creams, toilette liquids and the like are in accordance with the present method handled in a more practical and hygienic manner than at present. Ski-coatings for example for use on hard snow (consisting substantially of wood tar and dissolved rubber) are tough and cumbersome to handle and must be heated or burnt on the ski surface, by means of dimethyl ether these materials are brought into thinly fluid condition and the dimethyl ether rapidly evaporates when the ski coating has been spread on the ski surface.

In general the method according to the invention can be used in connection with any substances (in any state of aggregation) which are able to be brought into sprayable condition by means of dimethyl ether or other suitable gas.

Several embodiments of apparatus arranged in accordance with the invention are illustrated in the accompanying drawing.

Fig. 1 is a sectional view of an apparatus for the production of spray.

Fig. 2 is a sectional view of an apparatus constructed for distributing substances of thickly fluid consistency which are to be spread on surfaces.

Fig. 3 illustrates a modified embodiment of a detail.

In the example illustrated in Fig. 1 a bottle or container 1 constructed of any suitable material is provided with a valve casing 2 with ascending pipe 3, valve 4, pressure knob 5 and ejector 6. The bottom of the bottle which may for example consist of brass is provided with a short pipe 7 to be used for filling the bottle under pressure. This pipe can be closed by compression and it may be by soldering when the bottle has been filled. The valve is kept in place besides by the action of the inner pressure also by a spring 8. The reference number 9 designates an elastic diaphragm consisting for example of rubber. The valve body has a pointed end 10, which can penetrate a staniol disk 11 by the first use of the bottle. The lower edge of the pressure knob has a recess 12 fitting over the ejector 6. Only when the pressure knob has been turned so as to place the said recess over the ejector the pressure knob can be operated so as to influence the valve. In other positions the pressure knob will thus lock the valve. The ejector thus operates not only as spraying orifice but also as a stop. 13 is an opening from the ascending pipe 3 to the gas space in the bottle.

Instead of filling the container through the pipe, the container may of course be filled through the ejector pipe, when the disk 11 has been removed or perforated.

In the arrangement illustrated in Fig. 1 the capshaped knob is at the inner edge provided with an open recess (not shown) in which the ejector pipe 6 fits in a certain position of the cap. In the example illustrated in Fig. 3 the recess is closed and has such a form as to enable fastening of the cap in the upper position (closing position) as well as in the lower (or opening) position.

Instead of using a mixture of the material with the condensed gas (or gases) the condensed gas can also be placed in small containers which are inserted in or connected with the container for the material to be distributed for example in the manner illustrated in U. S. A. Patent 1,329,831.

A bottle of the form illustrated in Fig. 1 with an inner volume of 120 cm.³ and a diameter of about 40 mm. made of 0.5 mm. brass plate will have a much greater strength than what is required. It has been found by tests that such a bottle bursts only when the inner superpressure is 81 atmospheres at +41° C. Dimethyl ether has a superpressure of 6.6 atmospheres so that the safety coefficient is as 81 : 6 x 6. (The normal safety coefficient for pressure vessels for example autoclaves, steam generators is from 8–10.)

The critical pressure of dimethyl ether is thus in the mentioned tested brass bottle considerably below the critical pressure of the brass bottle.

In the example illustrated in Fig. 2 no ejector has been arranged, but the supply pipe for the material opens in the center of a top plate 15 formed as a spreading member. The said plate 15 has rounded edges 16, which can be made use of for spreading material in the hollows in ski surfaces and the like.

Claim:

The method of spraying coating compositions comprising selecting a coating composition in which dimethyl ether is soluble, securing a fine dispersion of the coating composition by dissolving in it the dimethyl ether, constituting the dimethyl ether an expelling agent for the coating composition by confining the solution under such pressure as to maintain the dimethyl ether in condensed state while so confined, and ridding the issuing stream of coating composition of the dimethyl ether at the time of spraying, by permitting its free evaporation adjacent the point at which it issues from its place of confinement, thereby securing the minute atomization of the coating composition by virtue of its previous state of fine dispersion when in said solution.

In testimony whereof I have signed my name to this specification.

ERIK ROTHEIM.